United States Patent
Komatsu

(10) Patent No.: US 8,732,362 B2
(45) Date of Patent: May 20, 2014

(54) RECEIVING APPARATUS AND RECEIVING METHOD

(75) Inventor: Eiji Komatsu, Kanagawa (JP)

(73) Assignee: Sony Corporation (JP)

( * ) Notice: Subject to any disclaimer, the term of this patent is extended or adjusted under 35 U.S.C. 154(b) by 95 days.

(21) Appl. No.: 13/106,200

(22) Filed: May 12, 2011

(65) Prior Publication Data

US 2011/0285903 A1    Nov. 24, 2011

(30) Foreign Application Priority Data

May 19, 2010    (JP) ................. P2010-115422

(51) Int. Cl.
*G06F 3/00* (2006.01)
*G06F 13/12* (2006.01)
*G06F 13/38* (2006.01)

(52) U.S. Cl.
USPC ................. 710/65; 710/15; 710/30

(58) Field of Classification Search
None
See application file for complete search history.

(56) References Cited

U.S. PATENT DOCUMENTS

2008/0252782 A1*  10/2008  Komeno ............... 348/512
2010/0066919 A1*  3/2010  Nakajima et al. ........ 348/734

FOREIGN PATENT DOCUMENTS

JP    2009038596 A    2/2009

* cited by examiner

*Primary Examiner* — Zachary K Huson
(74) *Attorney, Agent, or Firm* — Lerner, David, Littenberg, Krumholz & Mentlik, LLP

(57) ABSTRACT

Provided is a receiving apparatus including: a first receiving unit which receives a content signal including a first signal and a second signal corresponding to a predetermined transmission standard, recovers the first signal and the second signal included in the content signal, and outputs the recovered first signal and the recovered second signal; a transmitting unit which receives the second signal output from the first receiving unit, converts the second signal to the content signal corresponding to the predetermined transmission standard, and transmits the content signal; and a second receiving unit which receives the content signal transmitted from the transmitting unit, recovers the second signal included in the content signal, and outputs the recovered second signal.

7 Claims, 9 Drawing Sheets

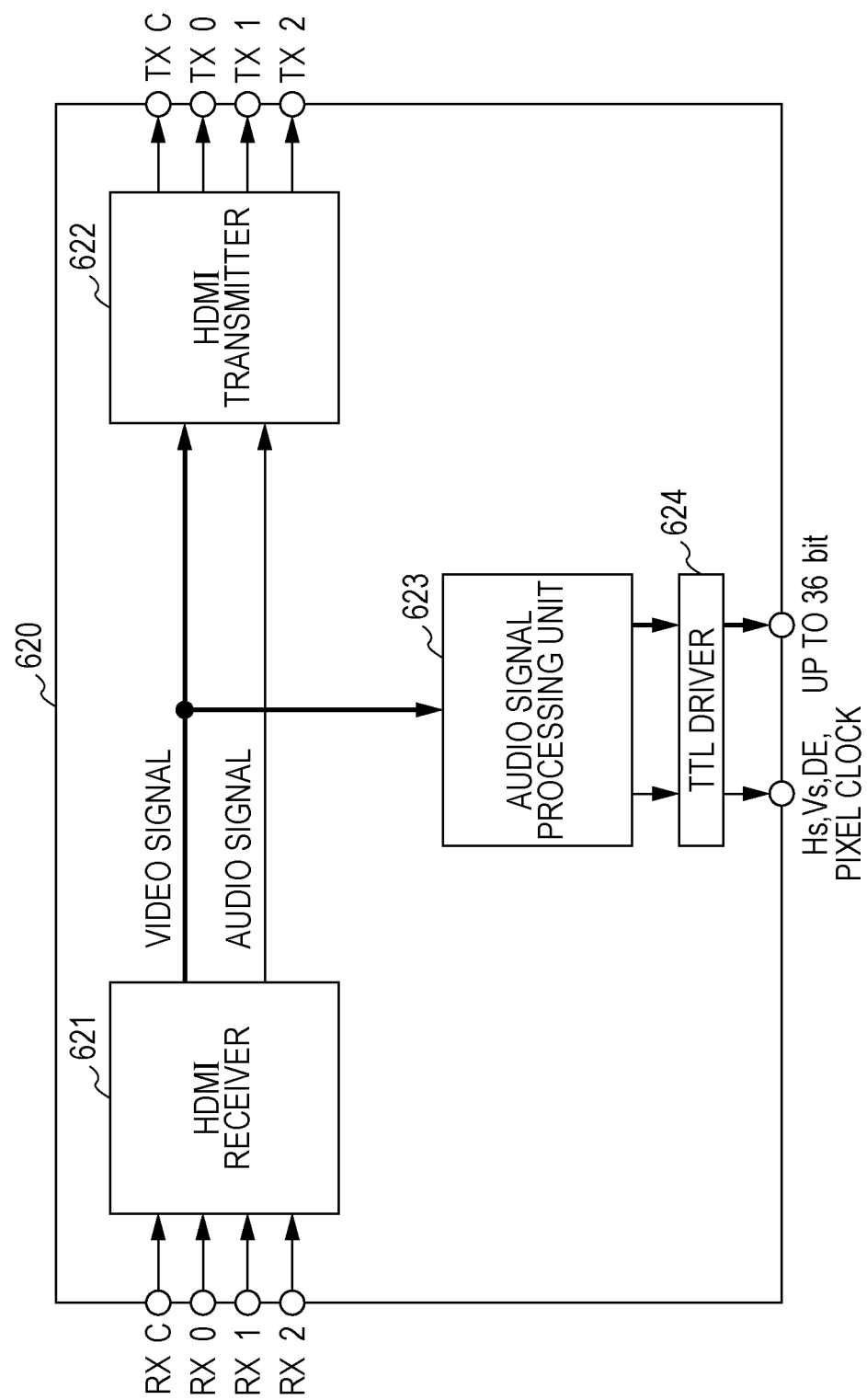

RECEIVING APPARATUS AND RECEIVING METHOD

CROSS-REFERENCE TO RELATED APPLICATION

The present application claims priority from Japanese Patent Application No. JP 2010-115422 filed in the Japanese Patent Office on May 19, 2010, the entire content of which is incorporated herein by reference.

BACKGROUND OF THE INVENTION

1. Field of the Invention

The invention relates to a receiving apparatus and a receiving method, and more particularly, to a receiving apparatus and a receiving method capable of obtaining high-quality video and audio by receiving a content signal transmitted according to a predetermined transmission standard.

2. Description of the Related Art

Recently, AV (Audio/Visual) apparatuses treating digital video and audio signals have spread. In addition, accordingly, as an interface for transmitting the digital video or audio signal, an HDMI (High Definition Multimedia Interface) as a digital data transmission standard has spread. The HDMI is configured by using a DVI (Digital Video Interface), which is a standard for connecting a computer and a monitor, as a base and by further adding an audio transmitting function, a control signal transmitting function, and the like to the DVI. The HDMI has been widely employed mainly, in TV sets, Blu-ray (registered trade mark) disc players, hard disc recorders, game machines, and the like.

In the HDMI, the transmission side is referred to as a source, and the reception side is referred to as a sink. A video signal, an audio signal, or a control signal may be transmitted through one cable from the source to the sink. The transmission of the video signal, and the audio signal is performed in one-way direction from the source to the sink. An AV system capable of enjoying high-quality video and audio may be constructed by connecting various players corresponding to the HDMI and display apparatuses such as monitors through the amplification apparatus by using the HDMI cable. In the AV system, the content data including the video signal and the audio signal are transmitted from the player to the monitor through the amplification apparatus.

If the HDMI is used, high-quality video and audio signals may be transmitted. However, the quality of the output video and audio is not yet sufficiently satisfactory, and there are various problems causing deterioration in the quality of the video and audio. One of these various problems is caused by jitter occurring in a clock signal.

For example, even though an apparatus of the sink side may generate a clock with very high accuracy, in the case where the accuracy of the clock generated in the source side is low, the sink side necessarily reproduces the content by regenerating the clock by using parameters generated based on the clock having low accuracy. Therefore, the reproduction of high-quality video and audio may not be performed.

Therefore, as the technology disclosed in Japanese Unexamined Patent Application Publication No. 2009-38596, a method of transmitting a high-quality audio signal by extremely suppressing jitter in an audio clock is proposed. Herein, the jitter is a time shift or fluctuation of a signal occurring in an apparatus or the like associated with video or audio. If the jitter occurs at the time of transmission, quality deterioration or the like of the video or the audio occurs due to interference or the like between the signal and adjacent signals.

SUMMARY OF THE INVENTION

However, with respect to the deterioration in quality of the content caused by the occurrence of jitter, particularly, with respect to the deterioration in sound quality, besides the aforementioned deterioration associated with the transmission, the deterioration caused by the simultaneous transmission of the video and the audio signals also exists. Herein, in the case where a general AV system configured by connecting a source and a sink by using an HDMI cable is exemplified as illustrated in FIG. 1, the deterioration caused by the simultaneous transmission of the video and the audio signals is described.

The AV system is configured to include a disc reproduction apparatus 10, an amplification apparatus (so-called an AV amplifier) 20, a monitor 30, a first HDMI cable connecting the disc reproduction apparatus 10 and the amplification apparatus 20, and a second HDMI cable 52 connecting the amplification apparatus 20 and the monitor 30. In addition, a speaker 40 is connected to the amplification apparatus 20. The disc reproduction apparatus 10 is, for example, a Blu-ray disc player and converts a video signal and an audio signal, which are read from a disc by the disc reproducing unit 11, to a TMDS (Transition Minimized Differential Signaling) signal through an HDMI transmitting unit 12 and transmits the TMDS signal through the first HDMI cable 51 to the amplification apparatus 20. An HDMI receiving unit 22 disposed in the amplification apparatus 20 receives the TMDS signal transmitted from the HDMI transmitting unit 12 and separates and extracts the video signal and the audio signal included in the TMDS signal to recover the video signal and the audio signal.

The recovered video signal is output to a video signal processing unit 23. After a predetermined process is applied thereto, the processed video signal is output to an HDMI transmitting unit 24. Next, the video signal is converted to a TMDS signal again by the HDMI transmitting unit 24, and the TMDS signal is transmitted to the monitor 30. Next, finally, the TMDS signal is displayed as video image by a display unit 33 of the monitor 30. On the other hand, the recovered audio signal is output to a reproduction signal processing/amplifying unit 26 to be subject to a predetermined process and an amplifying process, and finally, the processed audio signal is output as audio to the speaker 40.

In the amplification apparatus 20 in the related art, recovering and outputting of the video signal and the audio signal from the TMDS signal are performed by the HDMI receiving unit 22. At this time, a large number of high-speed TTL (transistor-transistor logic) drivers are operated so as to output the video signal in the HDMI receiving unit 22. The operation of the TTL driver influences the internal power supply voltage of the HDMI receiving unit 22 and, furthermore, greatly fluctuates the ground, so that the jitter occurs in the audio master clock. Since the jitter occurring in the audio master clock causes a phase change in the audio at the time of the D/A conversion, the quality of the audio output from the speaker is deteriorated. In addition, the TTL driver for outputting the audio signal is also installed in the HDMI receiving unit 22, so that it is considered that the quality of the video signal is also deteriorated by the operation of the TTL driver at the time of outputting the audio signal.

In addition, it is known that, in a predetermined disc reproduction apparatus, if the video signal is output as analog signal and the audio signal is output by using the HDMI, the sound quality is improved. It is considered that this is because a change in jitter amount occurs between the case where the video signal is carried and the case where the video signal is not carried.

In order to avoid the deterioration in the quality of the audio caused by the output of the video signal, two HDMI output terminals are provided to the disc reproduction apparatus. One of the two HDMI output terminals is used as a video-dedicated output terminal to be directly connected to the monitor. In addition, only the video signal is transmitted to the monitor. In addition, the other of the two HDMI output terminals is used as an audio-dedicated output to be connected to the amplification apparatus, so that only the audio signal is transmitted to the amplification apparatus.

However, in the configuration where the two HDMI output terminals are provided, the wire connection is complicated, so that the advantage in that it is possible to transmit the video signals and the audio signals through one cable is lost. In addition, since the two the HDMI outputs are provided, there are problems in that the cost is increased and the overall control of the AV system may not be easily performed.

Therefore, it is desirable to provide a receiving apparatus and a receiving method capable of obtaining high-quality video and audio which have small jitter influence.

According to a first embodiment of the invention, there is provided a receiving apparatus including: first receiving means for receiving a content signal including a first signal and a second signal corresponding to a predetermined transmission standard, recovering the first signal and the second signal included in the content signal, and outputting the recovered first signal and the recovered second signal; transmitting means for receiving the second signal output from the first receiving means, converting the second signal to the content signal corresponding to the predetermined transmission standard, and transmitting the content signal; and second receiving means for receiving the content signal transmitted from the transmitting means, recovering the second signal included in the content signal, and outputting the recovered second signal.

According to a second embodiment of the invention, there is provided a receiving method including the steps of: receiving a content signal including a first signal and a second signal corresponding to a predetermined transmission standard, recovering the first signal and the second signal included in the content signal, and outputting the recovered first signal and the recovered second signal; receiving the second signal output in the step of receiving the content signal, converting the second signal to the content signal corresponding to the predetermined transmission standard, and transmitting the content signal; and receiving the content signal transmitted in the step of receiving the second signal, recovering the second signal included in the content signal, and outputting the recovered second signal.

According to the embodiments of the invention, it is possible to obtain high-quality video and/or audio from a content signal transmitted according to a predetermined transmission standard.

BRIEF DESCRIPTION OF THE DRAWINGS

FIG. 9 is a diagram illustrating a schematic configuration of an HDMI receiving/transmitting unit according to the second embodiment.

DESCRIPTION OF THE PREFERRED EMBODIMENTS

Hereinafter, embodiments of the invention will be described with reference to the drawings. In addition, the description will be made in the following order.
<1. First Embodiment>
<2. Second Embodiment>
<3. Modified Example>
<1. First Embodiment>

Figure 2:
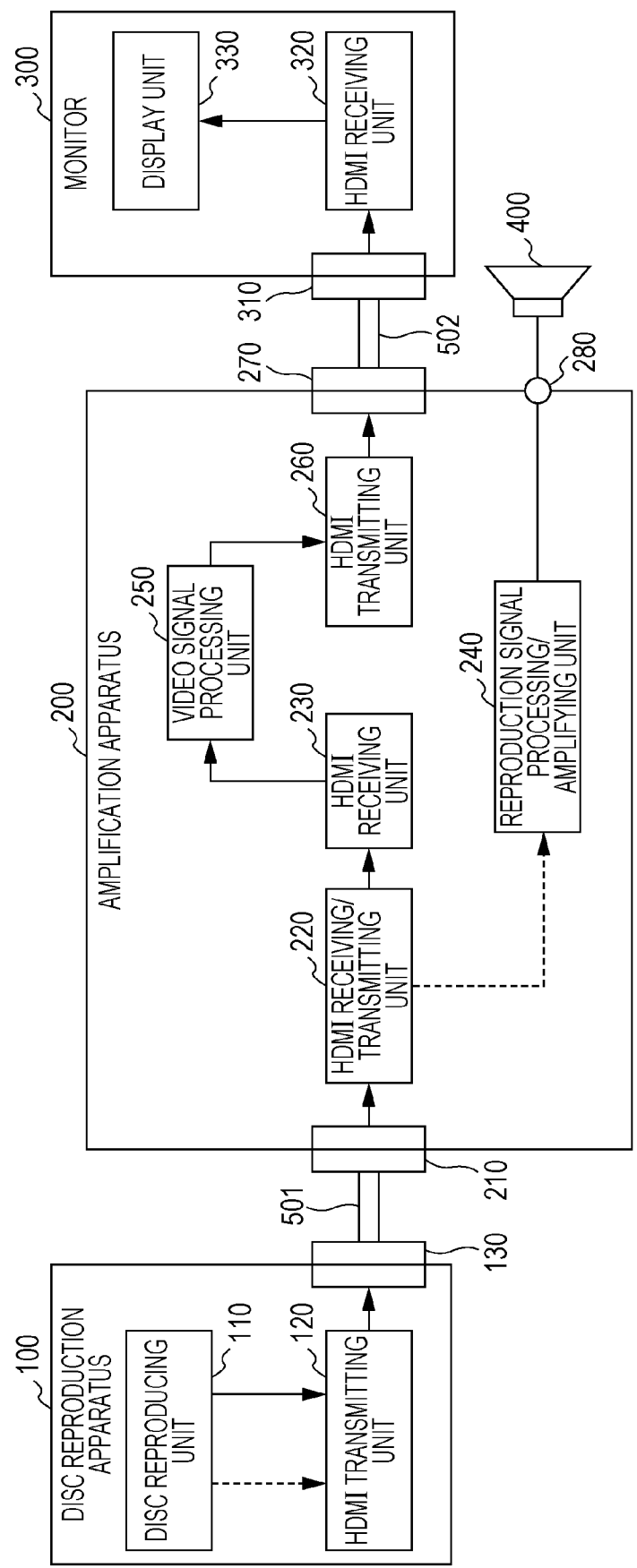
FIG. 2 is a diagram illustrating a schematic configuration of an AV system including an amplification apparatus having a receiving apparatus according to a first embodiment of the invention.

FIG. 2 is a diagram illustrating schematic configuration of an AV system configured to include an amplification apparatus 200 having a receiving apparatus according to the embodiment of the invention. The AV system is configured to include a disc reproduction apparatus 100 as a source, a monitor 300 as a sink, and an amplification apparatus 200 which is installed to relay the disc reproduction apparatus 100 and the monitor 300.

The disc reproduction apparatus 100 and the amplification apparatus 200 are connected to each other through a first HDMI cable 501. In addition, the amplification apparatus 200 and the monitor 300 are connected to each other through a second HDMI cable 502. In addition, in FIG. 2, with respect to the disc reproduction apparatus 100, the amplification apparatus 200, and the monitor 300, the components for transmitting and receiving the content signal through the HDMI are selectively illustrated.

The disc reproduction apparatus 100 as the source includes a disc reproducing unit 110, an HDMI transmitting unit 120, and an HDMI output terminal 130. The disc reproducing unit 110 performs reading (reproducing) a video signal and an audio signal as content from a mounted recording medium having a disc shape. The disc reproducing unit 110 includes a rotation driving unit (not shown) which rotates the disc, an optical pickup (not shown) which performs signal reading by illuminating a laser beam on the disc, a signal processing unit (not shown) which performs a predetermined process on the signal read by the optical pickup, and the like. The digital video signal and the digital audio signal read by the disc reproducing unit 110 are output to the HDMI transmitting unit 120. In addition, an audio clock is output from the disc reproducing unit 110 to the HDMI transmitting unit 120. The audio clock is used for ACR (Audio Clock Regeneration) in the HDMI. The audio clock is configured to be synchronized with the audio signal read by the disc reproducing unit 110.

The HDMI transmitting unit 120 generates transmitting data from the input video signal and the input audio signal according to the HDMI standard and converts the transmitting data to a transmitting signal (hereinafter, referred to as a TMDS signal) according to the TMDS. As a transmission method in the HDMI, a TMDS serial transmission method is used. Next, the TMDS signal is output to the HDMI output terminal 130. The HDMI output terminal 130 has a female plug having a structure corresponding to the HDMI standard so as to be connected to a male plug of the one end of the first HDMI cable 501. The TMDS signal output from the HDMI transmitting unit 120 to the HDMI output terminal 130 is transmitted to the amplification apparatus 200 through the HDMI output terminal 130 and the first HDMI cable 501.

In addition, as the disc reproduction apparatus 100, there is a Blu-ray disc player, a DVD (Digital Versatile Disc) player, or the like. In addition, the disc reproduction apparatus 100 is exemplified as a source. Any apparatus capable of outputting the content including the video signal and the audio signal according to the HDMI may be used as the source. As an apparatus which is the source, there is, for example, a hard disc recorder, a personal computer, a cable TV set top box, an entertainment apparatus such as PlayStation (registered trade mark of Sony Computer Entertainment) 3, or the like.

The amplification apparatus 200 includes an HDMI input terminal 210, an HDMI receiving/transmitting unit 220, an HDMI receiving unit 230, a reproduction signal processing/amplifying unit 240, a video signal processing unit 250, an HDMI transmitting unit 260, an HDMI output terminal 270, and an audio output terminal 280. A speaker 400 is connected to the amplification apparatus 200 through the audio output terminal 280. In addition, the HDMI receiving unit 230 corresponds to a second receiving unit in Claims. In addition, the HDMI receiving/transmitting unit 220 and the HDMI receiving unit 230 correspond to a receiving apparatus in Claims.

The HDMI input terminal 210 has a female plug having a structure corresponding to the HDMI standard so as to be connected to a male plug of the other end of the first HDMI cable 501. The TMDS signal transmitted from the disc reproduction apparatus 100 is input to the amplification apparatus 200 through the HDMI input terminal 210. The TMDS signal input through the HDMI input terminal 210 is received by the HDMI receiving/transmitting unit 220.

The HDMI receiving/transmitting unit 220 receives the TMDS signal transmitted through the first HDMI cable 501, extracts and recovers the video signal and the audio signal included in the TMDS signal, and outputs the recovered video and audio signals. The recovered video signal is converted to the TMDS signal again in the HDMI receiving/transmitting unit 220, and the TMDS signal is transmitted to the HDMI receiving unit 230. In addition, the recovered audio signal is output to the reproduction signal processing/amplifying unit 240.

Figure 3:
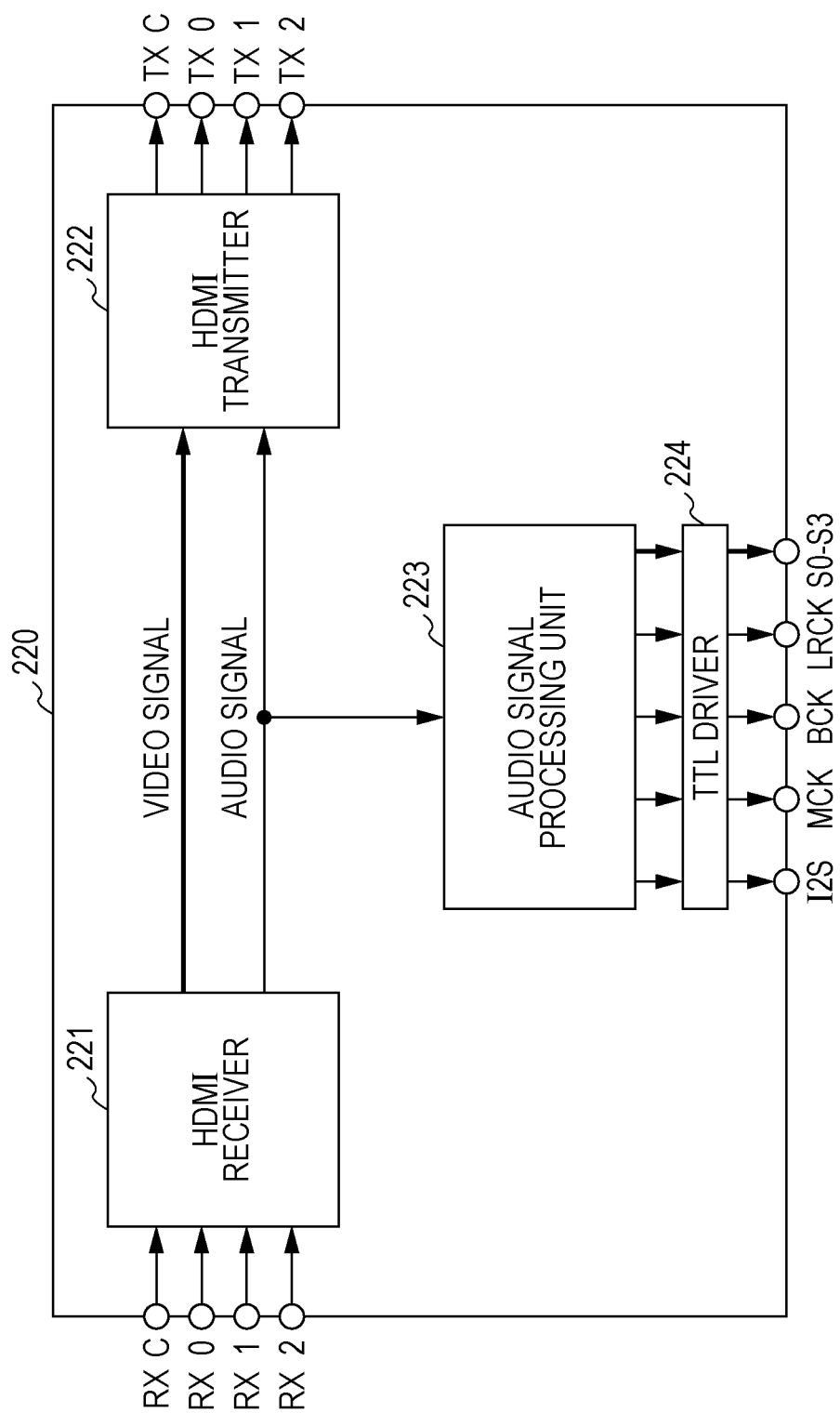
FIG. 3 is a diagram illustrating a schematic configuration of an HDMI receiving/transmitting unit according to the first embodiment.

Herein, the HDMI receiving/transmitting unit 220 is described. FIG. 3 is a schematic configuration diagram illustrating a configuration of the HDMI receiving/transmitting unit 220. The HDMI receiving/transmitting unit 220 includes a TMDS receiver 221, a TMDS transmitter 222, an audio signal processing unit 223, and a TTL driver 224. The HDMI receiving/transmitting unit 220 is configured with a device where the HDMI receiving function and the HDMI transmitting function are integrated into one chip. In addition, the TMDS receiver 221 corresponds to a first receiving unit in Claims. In addition, the TMDS transmitter 222 corresponds to a transmitting unit in Claims.

The TMDS receiver 221 receives the TMDS signal transmitted from the disc reproduction apparatus 100 through the first HDMI cable 501 and extracts and recovers the video signal and the audio signal included in the TMDS signal. In addition, the TMDS receiver 221 performs outputting the audio clock. The audio clock is a clock having the same frequency as that of the audio clock output from the disc reproducing unit 110. Next, the recovered video signal and the recovered audio signal are output to the TMDS transmitter 222. In addition, the recovered audio signal and the audio clock are output to the audio signal processing unit 223.

The TMDS transmitter 222 receives the video signal and the audio signal output from the TMDS receiver 221, converts the video signal and the audio signal to the TMDS signal again, and transmits the TMDS signal to the HDMI receiving unit 230. The audio signal processing unit 223 receives the audio signal output from the TMDS receiver 221, applies a predetermined signal process such as a format conversion process of converting the format of the audio signal to, for example, the I2S (Inter-IC Sound) format with respect to the audio signal, and outputs the processed signal to the TTL driver 224. Next, the audio signal is converted to a signal of the TTL level by the TTL driver 224, and the audio signal, an audio master clock MCK, a bit clock BCK, an LR clock LRCK, and the like are output from the TTL driver 224 to the reproduction signal processing/amplifying unit 240.

In this manner, the HDMI receiving/transmitting unit 220 is configured with a device having both of the HDMI receiving function and the HDMI transmitting function. Therefore, the reception of the TMDS signal, the extraction and recovery of the video signal and the audio signal from the TMDS signal, the re-conversion of the recovered video and audio signals to the TMDS signal, and the transmission of the TMDS signal may be performed in one device. Accordingly, it is possible to simplify the configuration of the amplification apparatus 200.

The HDMI receiving unit 230 receives the TMDS signal transmitted from the HDMI receiving/transmitting unit 220 and extracts and recovers the video signal and the audio signal included in the TMDS signal. Next, the HDMI receiving unit 230 outputs the recovered video signal to the video signal processing unit 250. In addition, although the HDMI receiving unit 230 and the HDMI transmitting unit 260 are connected to each other in terms of wire lines, in the embodiment, since the audio is output from the speaker 400 through the reproduction signal processing/amplifying unit 240, the audio signal may not be necessarily transmitted to the monitor 300. Therefore, the connection between the HDMI receiving unit 230 and the HDMI transmitting unit 260 is omitted. However, this does not denote that the output of the audio signal from the HDMI receiving unit 230 to the HDMI transmitting unit 260 is prohibited. Therefore, the audio signal may be transmitted to the monitor 300. As the case of transmitting the audio signal to the monitor 300, there is, for example, a case of not outputting the audio from the speaker 400 connected to the amplification apparatus 200 but outputting the audio from a speaker integrally constructed with the monitor 300. In addition, the audio signal may be output to the monitor 300 as well as the speaker 400. The changeover of the outputs may be performed by allowing a user to change the settings of the output of the amplification apparatus as a product employing the invention.

If necessary, the video signal processing unit 250 may perform a predetermined process such as a process of adding a GUI (Graphical User Interface) to the video signals according to the input video signals. Next, the video signal which is processed by the video signal processing unit 250 is output to the HDMI transmitting unit 260. The HDMI transmitting unit 260 converts the video signal received from the video signal processing unit 250 to the TMDS signal again and transmits the TMDS signal to the HDMI output terminal 270. Next, the TMDS signal is transmitted from the HDMI output terminal 270 through the second HDMI cable 502 to the monitor 300.

On the other hand, the reproduction signal processing/amplifying unit 240 performs a predetermined signal process such as D/A conversion and an amplifying process on the audio signal output from the HDMI receiving/transmitting unit 220. Next, the processed audio signal is output to the speaker 400 through the audio output terminal 280. The speaker 400 is an audio output unit for outputting the input audio signal as audio. The audio according to the audio signal is output from the speaker 400, so that the user may enjoy the audio of the content recorded on the disc.

The monitor 300 is a display unit for displaying the video and the image so as to provide the video and the image to a user. The monitor 300 is configured to include an HDMI input terminal 310, an HDMI receiving unit 320, and a display unit 330. The HDMI input terminal 310 is connected to a male plug of the other end of the second HDMI cable 502. The HDMI receiving unit 320 receives the TMDS signal transmitted from the amplification apparatus 200 through the second HDMI cable 502 and extracts and recovers the video signal included in the TMDS signal. Next, the video signal is output to the display unit 330 and, finally, displayed as video, so that the video is provided to the user. The display unit is, for example, a display panel such as an LCD (Liquid Crystal Display), a PDP (Plasma Display Panel), or an organic EL (Electro Luminescence) panel.

Figure 4:
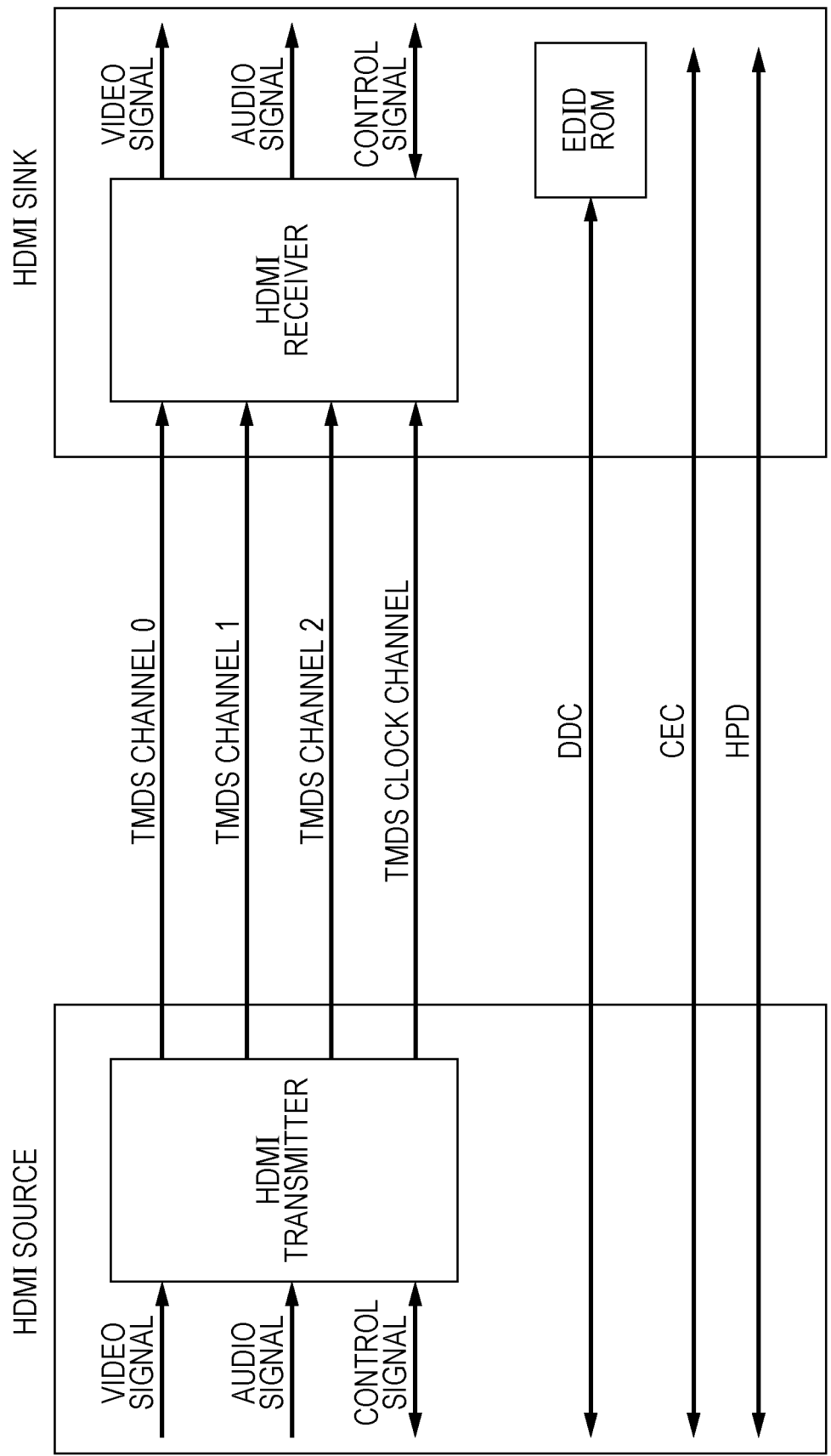
FIG. 4 is a diagram illustrating an overview of signal transmission and reception according to HDMI.

FIG. 4 is a diagram illustrating an overview of signal transmission and reception according to the HDMI standard. In the HDMI, the transmission of the content signal including the video signal and the audio signal is performed not in the two-way direction but in the one-way direction of the source to the sink. In the HDMI, the audio signal is transmitted by using a blank period between the video signals. The HDMI transmitting unit as a source includes an HDMI transmitter. The HDMI transmitter generates transmitting data so that the input video signal, the input audio signal, and the input control signal are fitted to a predetermined structure. Next, the obtained transmitting signal is converted to the TMDS signal. Next, the TMDS signal is transmitted through three TMDS channels 0, 1, and 2 as transmission paths.

In the HDMI, in an effective image period, which is a period of from a vertical synchronization signal to the next vertical synchronization signal excluding a horizontal blanking period and a vertical blanking period, differential signals corresponding to pixel data of a non-compressed one-screen image are transmitted to the sink through the TMDS channels 0, 1, and 2. In addition, in the horizontal blanking period or the vertical blanking period, differential signals corresponding to the audio data, the control data, and the like are transmitted to the sink through the TMDS channels 0, 1, and 2.

In addition, in the HDMI, besides the TMDS channels, a TMDS clock channel is provided. The TMDS clock channel is a transmission channel for transmitting the TMDS clock which is synchronized with the video signals transmitted through the TMDS channels 0, 1, and 2. The TMDS clock is also transmitted from the source to the sink through the TMDS clock channels.

The HDMI receiving unit as a sink includes an HDMI receiver. The HDMI receiver receives the TMDS signal and the TMDS clock transmitted from the HDMI transmitting unit through the TMDS channels 0, 1, and 2 and the TMDS clock channel. In addition, the HDMI receiver receives the TMDS signal in synchronization with the TMDS clock. Next, the HDMI receiver extracts and recovers the video signal, the audio signal, and the control signal from the TMDS signal received through the TMDS channels 0, 1, and 2. Next, the recovered video signal is transmitted to, for example, the video signal processing unit, and the recovered audio signal is transmitted to, for example, the reproduction signal processing/amplifying unit. In addition, the control signal is also extracted and recovered, and the recovered control signal is output. The control signal is, for example, used for control between an apparatus having an HDMI receiving unit and an apparatus having an HDMI transmitting unit. In this manner, the transmission and reception of the video signal, the audio signal, and the control signal are performed according to the TMDS standard by the HDMI transmitter and the HDMI receiver.

In addition, besides the TMDS channels 0, 1, and 2 and the TMDS clock channel, a transmission channel referred to as a DDC (Display Data Channel) is disposed between the HDMI transmitting unit and the HDMI receiving unit. At the same time of the transmission and reception of the TMDS signal and the TMDS clock between the HDMI transmitter and the HDMI receiver, communication through the DDC is performed between the HDMI transmitting unit and the HDMI receiving unit.

The HDMI receiving unit is provided with an EDIDROM which stores EDID (Extended Display Identification Data) as data of information on its own state, performance, and the like and various setting values. In addition, the DDC is used so that the HDMI transmitting unit reads out the EDID stored in the EDIDROM provided to the HDMI receiving unit. By the communication through the DDC, the source may recognize information and various setting values of an apparatus as a sink.

In addition, in the HDMI, inter-communication through CEC (Consumer Electronics Control) may be available. Two-way communication of apparatus control signals initiating command or the like according to, for example, remote controller manipulation or the like may be performed between the source and the sink by the communication through the CEC.

In addition, in the HDMI, a transmission channel referred to as an HPD (Hot Plug Detect) is provided. The source may detect the connection of the sink apparatus by an HPD signal transmitted and received through the HPD.

Figure 1:
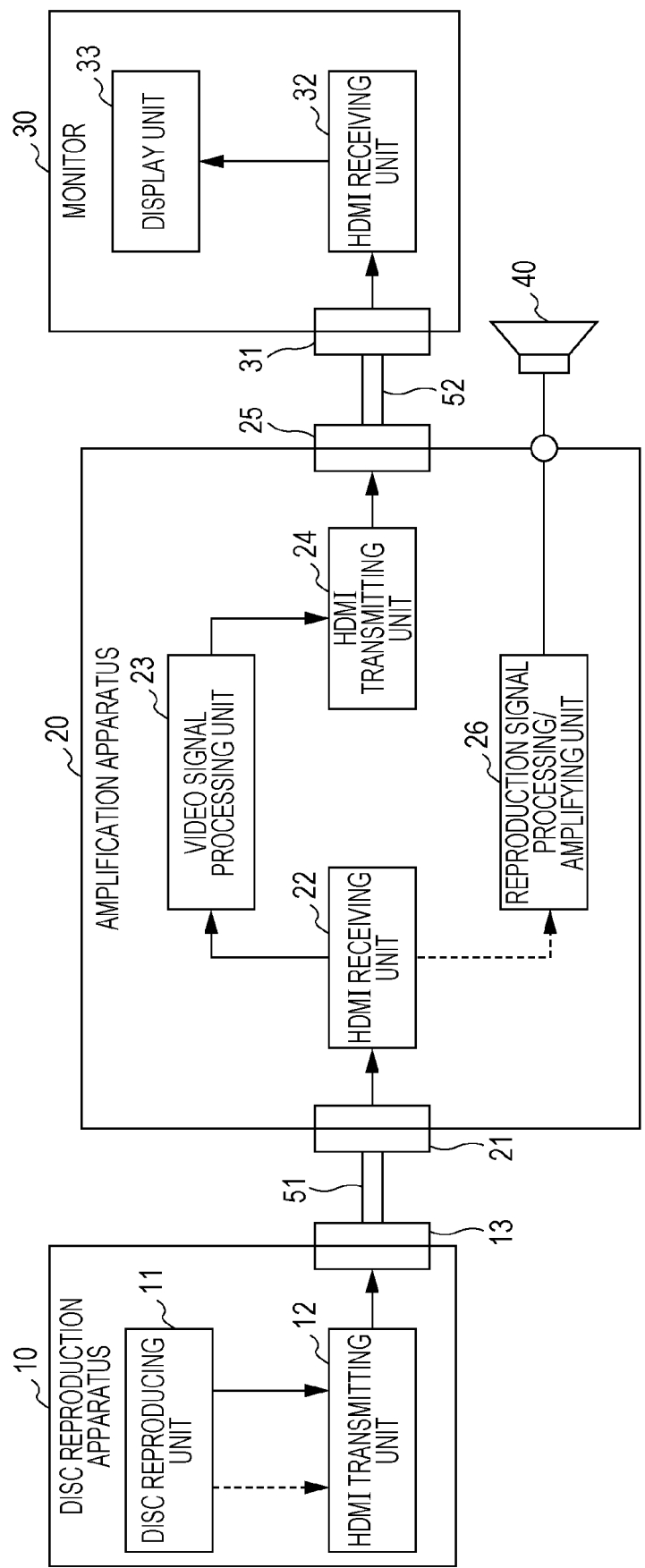
FIG. 1 is a diagram illustrating a schematic configuration of an AV system including an amplification apparatus in the related art.
Figure 5:
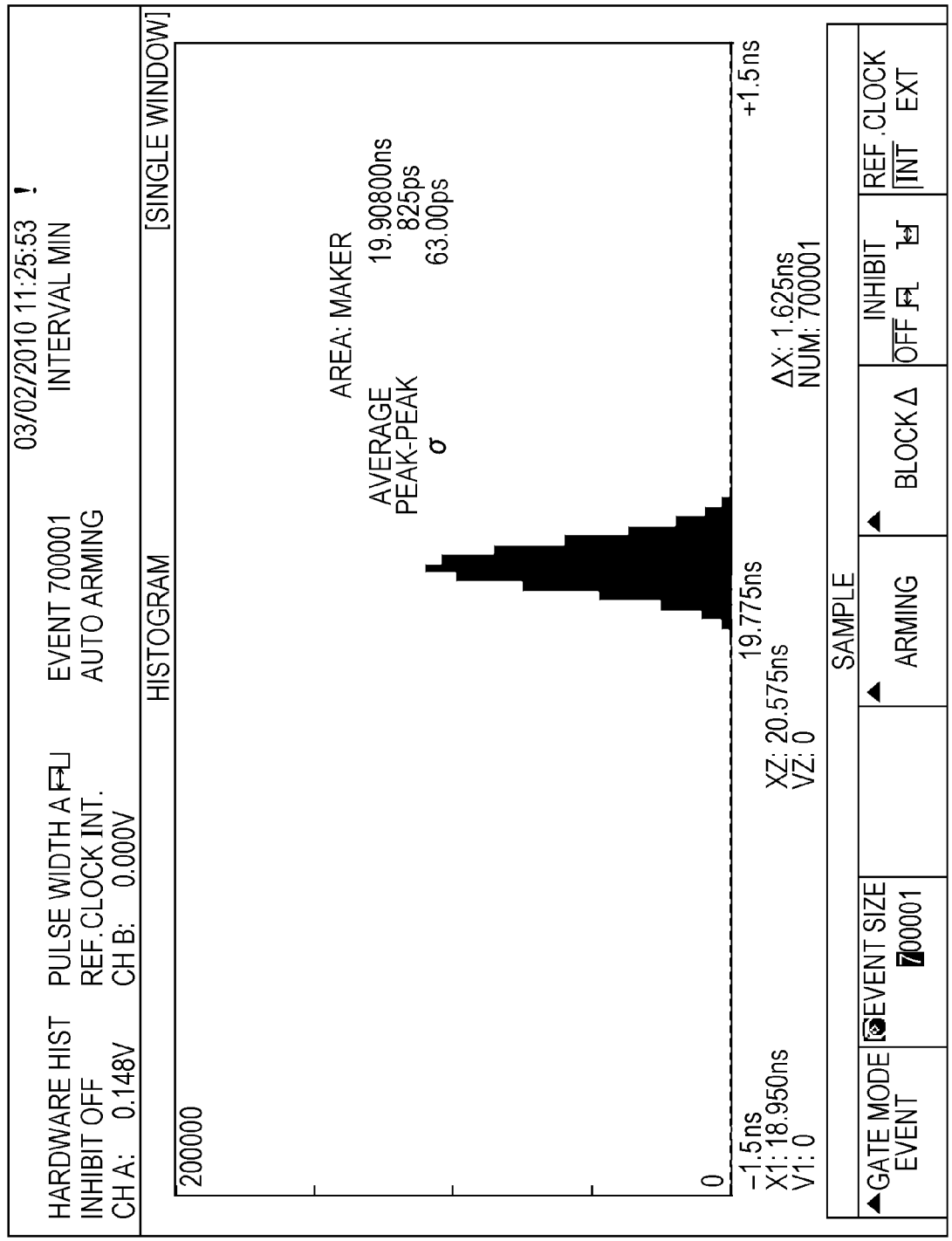
FIG. 5 is a histogram illustrating a measurement result of jitter in an MCK in a case where no video signal is included in a TMDS signal.
Figure 6:
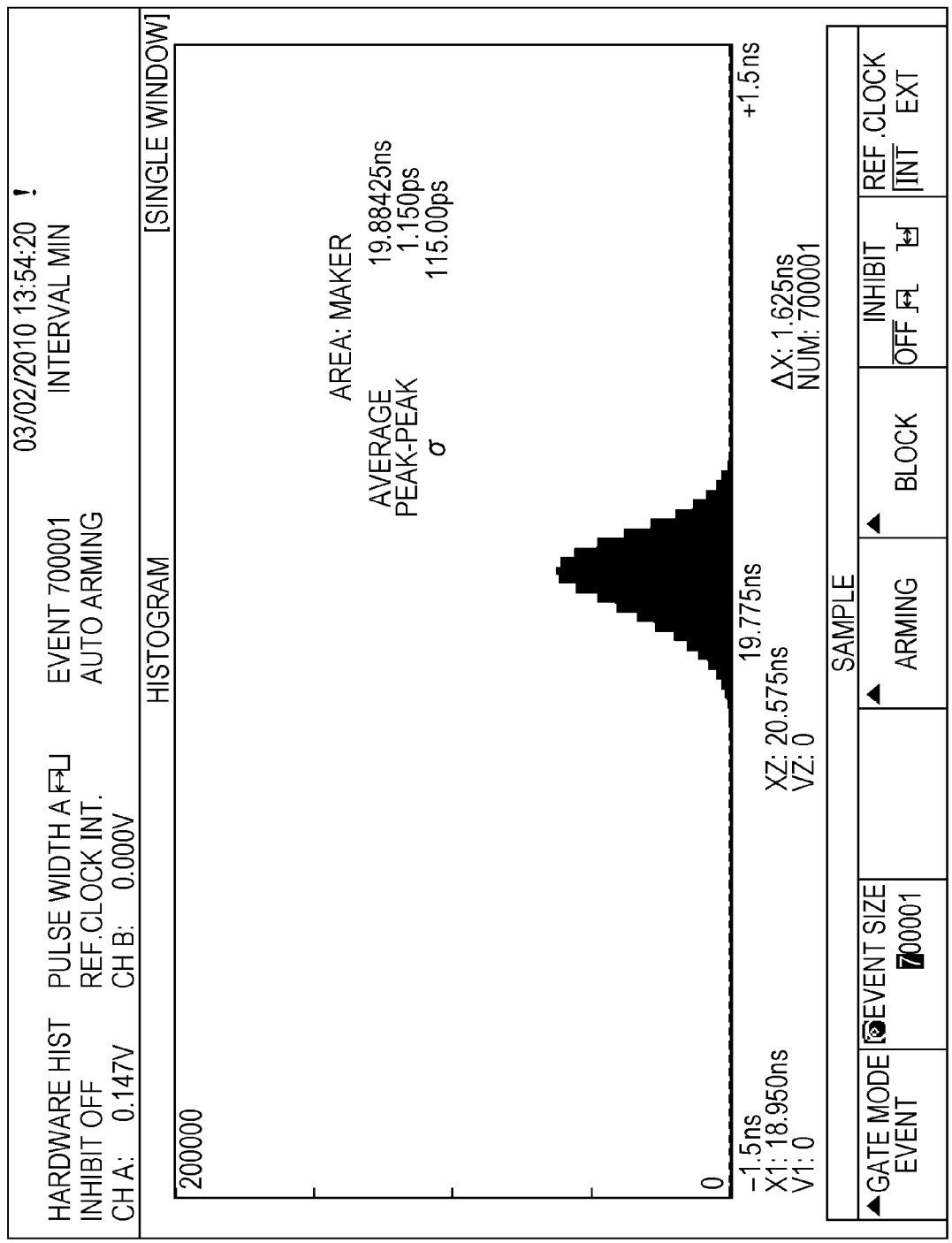
FIG. 6 is a histogram illustrating a measurement result of jitter in an MCK in a case where a video signal is included in a TMDS signal.
Figure 7:
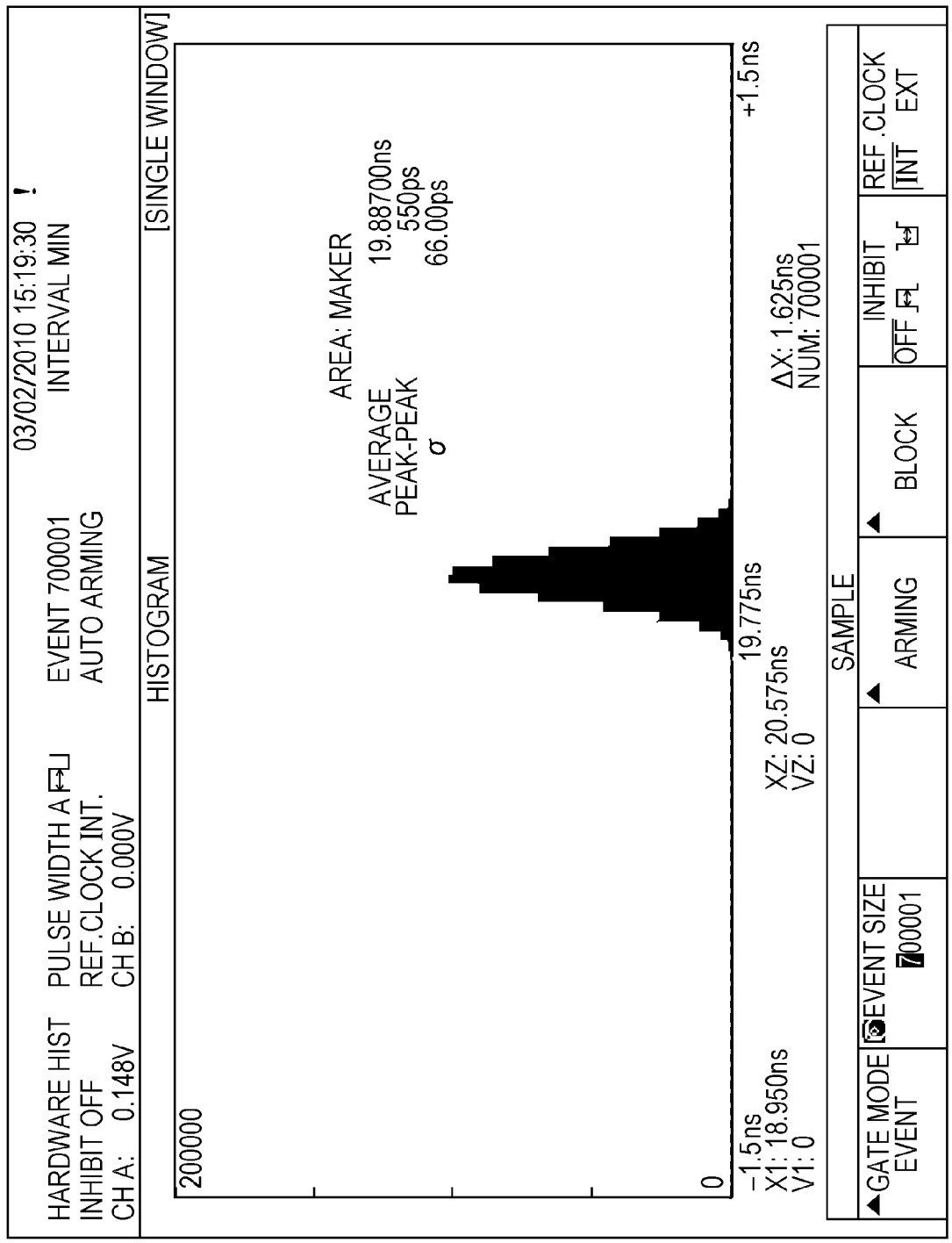
FIG. 7 is a histogram illustrating a measurement result of jitter in an MCK in a case where outputting of a video signal is stopped.

Next, the advantages which may be obtained according to the embodiment of the invention will be described with reference to FIGS. 5 to 7. FIGS. 5 to 7 are histograms for illustrating the states of the audio master clock (MCK), in which the horizontal axes indicate time (nsec) and the vertical axes indicate occurrence frequency. In addition, the histograms illustrated in FIGS. 5 to 7 are produced, for example, by measuring an MCK output from the HDMI receiving unit 22 constituting the amplification apparatus 20 illustrated in FIG. 1.

FIG. 5 illustrates an MCK in the case where the video image is entirely black, that is, the case where only the audio signal is included in the TMDS signal transmitted from the disc reproduction apparatus 10 to the HDMI receiving unit 22 but the video signal is not included. In addition, FIG. 6 illustrates an MCK in the case where a video exists, that is, the case where the audio signal and the video signal are included in the TMDS signal and the video signal and the audio signal are output from the HDMI receiving unit 22. In addition, FIG. 7 illustrates an MCK in the case where the outputting of the video signal is stopped in the state illustrated in FIG. 6.

As understood from the comparison of FIG. 5 and FIG. 6, in the case where the audio signal is output from the HDMI receiving unit 22 and, at the same time, the video signal is also output (the case illustrated in FIG. 6), the jitter occurring in the MCK is increased in comparison with the case where the video image is entirely black (the case illustrated in FIG. 5). This is because the operation of the TTL driver provided in the HDMI receiving unit 22 so as to output the video signal influences the internal power supply voltage and, furthermore, greatly fluctuates the ground, as described above. Therefore, the process for outputting the video signal may influence the MCK so that the jitter occurs. As a result, the sound quality may be deteriorated.

On the other hand, the histogram illustrated in FIG. 7 illustrates the MCK in the state that the outputting of the video signal from the HDMI receiving unit 22 is stopped, that is, the state that the TTL driver for outputting the video signal is allowed not to be operated. As illustrated in FIG. 3, since the TTL driver for outputting the video signal is not installed in the HDMI receiving/transmitting unit 220 according to the embodiment of the invention, it is possible to output the audio signal without influence on the operation of the TTL driver for outputting the video signal. Therefore, the histogram of FIG. 7 obtained by stopping the outputting the video signal may be a histogram in the case where the operation of the HDMI receiving/transmitting unit 220 according to the embodiment of the invention where the TTL driver for outputting the video signal is not installed is reproduced in a pseudo manner.

As understood from FIG. 7, the jitter of an MCK in the case where the outputting of the video signal is stopped becomes almost the same as the jitter in the case where there is no video signal as illustrated in FIG. 5. In other words, the occurrence of the jitter is suppressed down to a low level. Therefore, it may be understood that, in the case where the audio signal included in the TMDS signal is output, the video signal is not simultaneously output but only the audio signal is output, so that it is possible to suppress the jitter occurring in the MCK down to a low level. Accordingly, it is possible to prevent deterioration in audio quality caused by the jitter. In this manner, according to the first embodiment of the invention, it is possible to obtain a high-quality audio which is not influenced by change in an internal power supply voltage or ground according to the output of the video signal.

<2. Second Embodiment>

Figure 8:
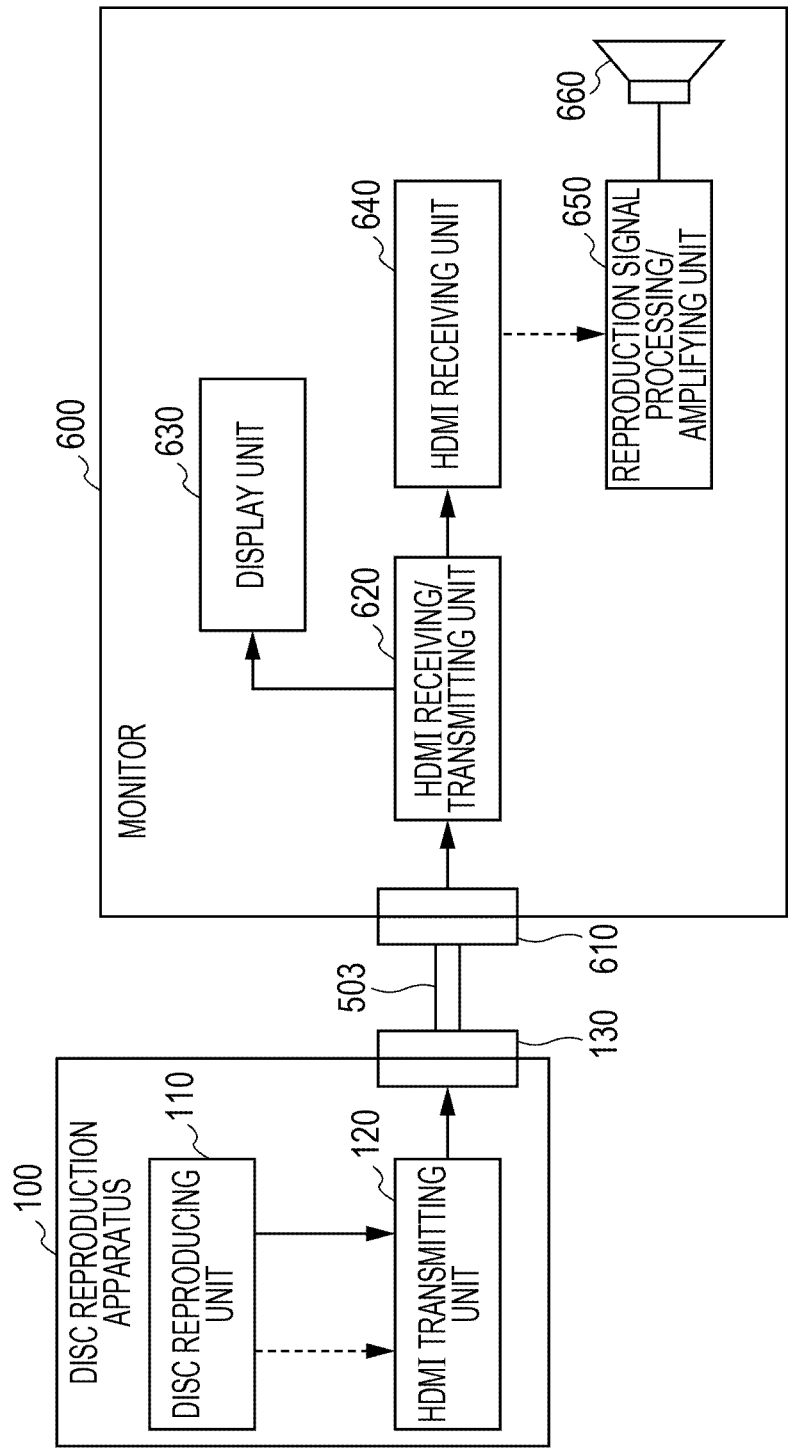
FIG. 8 is a diagram illustrating a schematic configuration of an AV system including a monitor having a receiving apparatus according to a second embodiment of the invention.

Hereinafter, a second embodiment of the invention will be described. In addition, in the second embodiment, the same components as those of the first embodiment are denoted by the same reference numerals, and the description thereof is omitted. FIG. 8 is a diagram illustrating a schematic configuration of an AV system configured to include a monitor 600 having a receiving apparatus according to the second embodiment. The disc reproduction apparatus 100 is the same as that of the first embodiment.

The monitor 600 includes an HDMI input terminal 610, an HDMI receiving/transmitting unit 620, a display unit 630, an HDMI receiving unit 640, a reproduction signal processing/amplifying unit 650, and a speaker 660. A male plug of the HDMI cable 503 is connected to the HDMI input terminal 610. The TMDS signal transmitted from the disc reproduction apparatus 100 is input to the HDMI receiving/transmitting unit 620 of the monitor 600 through the HDMI cable 503 and the HDMI input terminal 610.

The HDMI receiving/transmitting unit 620 receives the TMDS signal transmitted from the HDMI transmitting unit 120, extracts and recovers the video signal and the audio signal included in the TMDS signal, and outputs the video signal and the audio signal. The recovered video signal is transmitted to the display unit 630. In addition, the recovered audio signal is converted to the TMDS signal again in the HDMI receiving/transmitting unit 620, and the TMDS signal is transmitted to the HDMI receiving unit 640.

Herein, the HDMI receiving/transmitting unit 620 is described. FIG. 9 is a schematic configuration diagram illustrating a configuration of the HDMI receiving/transmitting unit 620. The HDMI receiving/transmitting unit 620 includes a TMDS receiver 621, a TMDS transmitter 622, a video signal processing unit 623, and a TTL driver 624. The HDMI receiving/transmitting unit 620 is configured with a device which is implemented so that the HDMI receiving function and the HDMI transmitting function are integrated into one chip. In the second embodiment, the HDMI receiving/transmitting unit 620 outputs the video signal through the TTL driver 624, converts the audio signal to the TMDS signal again, and transmits the TMDS signal to the HDMI receiving unit 640.

The TMDS receiver 621 receives the TMDS signal transmitted from the disc reproduction apparatus 100 through the HDMI cable 503, separates and extracts the video signal and the audio signal included in the TMDS signal, and recovers the video signal and the audio signal. The recovered video signal and the recovered audio signal are output to the TMDS transmitter 622. In addition, the recovered video signal is output to the video signal processing unit 623 as well as the TMDS transmitter 622.

The TMDS transmitter 622 receives the video signal and the audio signal output from the TMDS receiver 621, converts the video signal and the audio signal to the TMDS signal again, and transmits the TMDS signal to the HDMI receiving unit 640. The video signal processing unit 623 receives the video signal output from the TMDS receiver 621, applies a predetermined process, for example, a format conversion process, or the like with respect to the video signal, and outputs the processed video signal to the TTL driver 624. Next, the video signal is converted to a signal of the TTL level by the TTL driver 624, and the video signal corresponding to for example, 36-bit deep color, a vertical synchronization signal (VSYNC), a horizontal synchronization signal (HSYNC), a DE (Data Enable) signal, and a pixel clock are output to the display unit 630. Next, the video images according to the video signal is displayed on the display unit 630, so that the video is provided to a user. In addition, if necessary, a video signal processing unit which performs a predetermined process such as a process of adding a GUI to the video signals according to the input video signal may be disposed between the HDMI receiving/transmitting unit 620 and the display unit 630.

In this manner, the HDMI receiving/transmitting unit 620 is configured with a device having both of the HDMI receiving function and the HDMI transmitting function. Therefore, the reception of the TMDS signal, the extraction and recovery of the video signal and the audio signal, the outputting of the video signal, the re-conversion of the video signal and the audio signal to the TMDS signal, and the transmission of the TMDS signal may be performed in one device. In addition, the TMDS receiver 621 corresponds to a first receiving unit in Claims, and the TMDS transmitter 622 corresponds to a transmitting unit in Claims.

The HDMI receiving unit 640 receives the TMDS signal transmitted from the HDMI receiving/transmitting unit 620 and extracts and recovers the video signal and the audio signal included in the TMDS signal. Next, the HDMI receiving unit 640 outputs the recovered audio signal to the reproduction signal processing/amplifying unit 650. In addition, the HDMI receiving/transmitting unit 620 and the HDMI receiving unit 640 correspond to a receiving apparatus in Claims.

The reproduction signal processing/amplifying unit 650 performs a predetermined audio signal process and an amplifying process on the audio signal output from the HDMI receiving unit 640 and outputs the processed audio signal to the speaker 660. Next, the speaker 660 outputs the input audio signal as audio, so that the audio is provided to a user.

In the second embodiment, contrary to the first embodiment, the HDMI receiving/transmitting unit 620 outputs the video signal, and the audio signal is converted to the TMDS signal again to be transmitted in the HDMI receiving/transmitting unit 620. Since the TTL driver for outputting the audio signal is not installed in the HDMI receiving/transmitting unit 620, it is possible to suppress the jitter, which occurs in the pixel clock due to the influence of the operation of the TTL driver, down to a low level. Accordingly, it is possible to prevent deterioration in video quality caused by the jitter. In this manner, according to the second embodiment of the invention, it is possible to obtain a high-quality video which is not influenced by change in an internal power supply voltage or ground according to the output of the audio signal.

<3. Modified Example>

Hereinbefore, although the embodiments of the invention are specifically described, the invention is not limited to the aforementioned embodiments. Various modifications may be available on the basis of the technical spirit of the invention. For example, in the aforementioned first and second embodiment, the description is made under the assumption that the receiving apparatus according to the embodiments of the invention is adapted to an amplification apparatus. However, adaptation of the receiving apparatus is not limited to the amplification apparatus, but the receiving apparatus may be adapted to an AV selector having no amplifying unit for performing an amplifying process on the audio signal.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving apparatus comprising:
    first receiving means for receiving a content signal including a first signal and a second signal as a transition minimized differential signaling (TMDS) signal and in accordance with a predetermined transmission standard, recovering the first signal and the second signal included in the content signal, and outputting the recovered first signal and the recovered second signal;
    transmitting means for receiving the second signal output from the first receiving means, converting the second signal from the first receiving means to a second content signal including the second signal from the first receiving means as a TMDS signal and in accordance with the predetermined transmission standard, and transmitting the second content signal; and
    second receiving means for receiving the second content signal transmitted from the transmitting means without the second content signal transmitted from the transmitting means being transmitted external to the apparatus, recovering the second signal included in the second content signal, and outputting the second signal recovered from the second content signal.

2. The receiving apparatus according to claim 1, wherein the first signal is an audio signal, and the second signal is a video signal.

3. The receiving apparatus according to claim 1, wherein the first receiving means and the transmitting means are configured to be integrated into one chip.

4. The receiving apparatus according to claim 1, wherein the first signal is a video signal and the second signal is an audio signal.

5. The receiving apparatus according to claim 1, wherein the predetermined transmission standard is High Definition Multimedia Interface (HDMI).

6. A receiving method comprising the steps of:
    receiving, at an apparatus, a content signal including a first signal and a second signal as a transition minimized differential signaling (TMDS) signal and in accordance with a predetermined transmission standard, recovering the first signal and the second signal included in the content signal, and outputting the recovered first signal and the recovered second signal;
    receiving, at the apparatus, the second signal output in the step of receiving the content signal, converting the second signal output in the step of receiving the content signal to a second content signal including the second signal output in the step of receiving the content signal as a TMDS signal and in accordance with the predetermined transmission standard, and transmitting the second content signal; and
    receiving, at the apparatus, the second content signal transmitted in the step of receiving the second signal without the second content signal transmitted in the step of receiving the second signal being transmitted external to the apparatus, recovering the second signal included in the second content signal, and outputting the second signal recovered from the second content signal.

7. A receiving apparatus comprising:
    a first receiving unit which receives a content signal including a first signal and a second signal as a transition minimized differential signaling (TMDS) signal and in accordance with a predetermined transmission standard, recovers the first signal and the second signal included in the content signal, and outputs the recovered first signal and the recovered second signal;
    a transmitting unit which receives the second signal output from the first receiving unit, converts the second signal from the first receiving unit to a second content signal including the second signal from the first receiving unit as a TMDS signal and in accordance with the predetermined transmission standard, and transmits the second content signal; and
    a second receiving unit which receives the second content signal transmitted from the transmitting unit without the second content signal transmitted from the transmitting unit being transmitted external to the apparatus, recovers the second signal included in the second content signal, and outputs the second signal recovered from the second content signal.

* * * * *